(12) United States Patent
Higgins

(10) Patent No.: US 8,725,540 B2
(45) Date of Patent: May 13, 2014

(54) AUTOMATED SYSTEM AND METHOD FOR EVALUATING INSURABLE RISKS AT POINT OF SALE

(75) Inventor: G. Michael Higgins, Fort Wayne, IN (US)

(73) Assignee: Swiss Reinsurance Company Ltd., Zurich (CH)

( * ) Notice: Subject to any disclaimer, the term of this patent is extended or adjusted under 35 U.S.C. 154(b) by 2198 days.

(21) Appl. No.: 10/697,410

(22) Filed: Oct. 30, 2003

(65) Prior Publication Data

US 2005/0108062 A1    May 19, 2005

(51) Int. Cl.
G06Q 40/00    (2012.01)
G06Q 10/00    (2012.01)
G06Q 50/00    (2012.01)

(52) U.S. Cl.
USPC ........................................ 705/4; 705/2; 705/3

(58) Field of Classification Search
USPC .......................................................... 705/2–4
See application file for complete search history.

(56) References Cited

U.S. PATENT DOCUMENTS

| | | | | |
|---|---|---|---|---|
| 4,567,359 A * | 1/1986 | Lockwood | ..................... | 235/381 |
| 4,831,526 A * | 5/1989 | Luchs et al. | ...................... | 705/4 |
| 4,975,840 A * | 12/1990 | DeTore et al. | .................... | 705/4 |
| 7,092,891 B2 * | 8/2006 | Maus et al. | ....................... | 705/2 |
| 2002/0013717 A1 * | 1/2002 | Ando et al. | ....................... | 705/4 |
| 2002/0029158 A1 * | 3/2002 | Wolff et al. | ....................... | 705/4 |
| 2003/0074277 A1 * | 4/2003 | Foutz | .............................. | 705/26 |
| 2003/0158758 A1 * | 8/2003 | Kanazawa et al. | ................ | 705/4 |
| 2003/0187768 A1 * | 10/2003 | Ryan et al. | ...................... | 705/35 |
| 2003/0208385 A1 * | 11/2003 | Zander et al. | ..................... | 705/4 |
| 2004/0039601 A1 * | 2/2004 | Anderson | ......................... | 705/2 |

* cited by examiner

*Primary Examiner* — Luke Gilligan
*Assistant Examiner* — Kristine Rapillo
(74) *Attorney, Agent, or Firm* — Oblon, Spivak, McClelland, Maier & Neustadt, L.L.P.

(57) ABSTRACT

A system and method for evaluating an insurable risk and providing an immediate, binding insurance offer to cover that risk, includes the collection of self-reported and objective information relating to the risk. The information is provided to an automated underwriting program that evaluates and rates the insurable risk and produces a binding insurance quote. Certain embodiments of the system and method utilize an automated application form and information gathering apparatus to collect the self-reported information. Objective information is obtained by a variety of means, including the direct measurement of certain physical and medical parameters. Certain embodiments may provide for the collection of information relating to payment for the insurance product, and the obtaining of an electronic signature from an applicant.

49 Claims, 36 Drawing Sheets

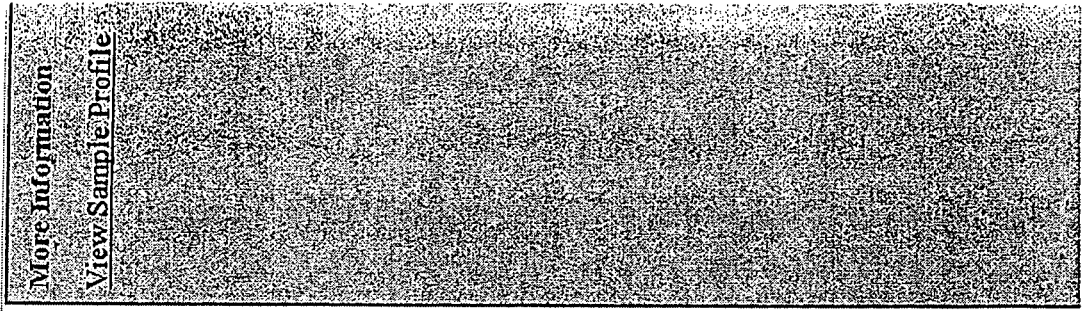
Welcome
Congratulations on your decision to monitor your health by participating in this health fair.
Simply use the mouse and keyboard to move through the following questions.
FIG. 8

Privacy Notice

Unless you later decide to apply for life insurance, the information you provide during this health fair will not be disclosed to anyone, including your employer. It will only be retained in a format that allows you to be identified from the information provided for regulatory compliance purposes. If you later decide to apply for life insurance, you will then be asked to authorize the disclosure of personally identifiable information to ABC Life Insurance Company and its support organizations for underwriting purposes.

[Not Interested] [Continue]

FIG. 9

Informed Consent and Waiver of Claims

○ I voluntarily consent to having my blood drawn during this health assessment.

○ I understand that the results of my health assessment are not a medical diagnosis and that a medical diagnosis can only be made by a qualified physician or licensed health care professional.

○ I agree that my receiving a health assessment will not create a doctor-patient or other healthcare professional relationship between me and the program sponsor.

○ I will not use the results of this health assessment as a substitute for seeking further information, diagnosis or treatment from my physician or other qualified health care provider.

○ I waive and release the sponsor of this health assessment of any and all claims or causes of action for damages that may result from my participation in this health assessment program.

[ I Understand and Consent ]

[ Not Interested ]

FIG. 10

Profile Identifying Information

Use the keyboard to enter information. Use the Tab key to move between fields. All fields marked with an asterisk (*) are required.

First Name* [Greg]    Middle Initial* [S]    Last Name* [Smith]

Birth Date* [12] [12] [1972] (m/d/yyyy)    State of Birth* [IN]

Address [123 Main St]

City* [Ft Wayne]    State* [IN]    Zip* [45666]

Phone* [987] [897] [7898]

Gender*  ● Male   ○ Female

Medical Conditions

In the past 10 years, I have had or consulted a medical professional for conditions affecting the following areas: (Select the link(s) for the body system(s) that may apply or to learn more about each body system)

Blood Disorder                     Mental/Psychological

Cerebral/Circulatory               Neurological/Nervous

Heart                              Muscles/Bones

Digestive                          Lungs

Diabetes and Other Gland           Tumor, Cancer, Lump, and
Conditions                         Growth Urinary                            Immune System Condition(s) that I don't know where to categorize

 No Medical Conditions In The Past 10 Years

Previous  Continue

FIG. 12

Medical History - Lungs

In the past 10 years, I have had or consulted a medical professional for:

- ☐ ADULT RESPIRATORY DISTRESS SYNDROME
- ☐ COLLAPSED LUNG
- ☐ SHORTNESS OF BREATH
- ☐ ALLERGIES
- ☐ EMPHYSEMA
- ☐ SINUS INFECTION
- ☒ ASTHMA
- ☐ LUNG CYST
- ☐ SLEEP APNEA
- ☐ CHRONIC BRONCHITIS
- ☐ PNEUMONIA
- ☐ TUBERCULOSIS
- ☐ CHRONIC LUNG DISORDER
- ☐ PULMONARY NODULE
- ☐ UPPER RESPIRATORY INFECTION
- ☐ OTHER CONDITION(S) NOT LISTED

☐ No history of Lungs

Followup Questions for

*ASTHMA*

Have you been treated in an emergency room or hospitalized for this problem in the last 2 yrs? ● Yes ● No Do you require regular use of inhaled bronchodilators or any use of inhaled steroids to control symptoms of this condition? ● Yes ● No Have you smoked any type of tobacco in the last 12 months? ● Yes ● No

[Previous] [Continue]

FIG. 14

Medical History for Condition(s) that I don't know where to categorize

You answered that you have a history of other Condition(s) that I don't know where to categorize. Please specify all of the other conditions that apply.

Other conditions not listed:

Drug, Tobacco and Alcohol Usage

Please answer the following questions:

*SMOKING HISTORY*

Have you used any form of tobacco or nicotine based product in the past 24 months?  ● Yes  ● No

*DRUG USAGE*

In the past 10 years, have you ever used any of the following: marijuana, heroin, cocaine, LSD, PCP, amphetamines, barbiturates, any derivative of these drugs, or any controlled substance except as prescribed by a licensed physician?  ● Yes  ● No

*ALCOHOL ABUSE*

In the past 10 years, have you had or consulted a medical professional for alcohol abuse?  ● Yes  ● No

[Previous] [Continue]

FIG. 16

Additional Questions

Please answer the following questions:

*FAMILY HISTORY*

Has anyone from your immediate family (parents, brothers, sisters) died from or been diagnosed with any cardiovascular disease or cancer prior to age 60?   ● Yes   ● No

*DRIVING RECORD*

In the past 2 years have you had 2 or more moving violations, or, in the past 5 years, have you been convicted of reckless driving, driving under the influence of alcohol or drugs, or had your driver's license suspended or revoked?   ● Yes   ● No

[Previous]  [Continue]

FIG. 17

Activities

In the past 2 years, have you flown as a pilot, co-pilot, or crew member or participated in any hazardous sports, such as auto, motorcycle, or powerboat racing, hang gliding, mountain climbing, skydiving, or scuba diving?

- ▓ Boat Racing
- ▓ Mountain Climbing
- ▓ Scuba Diving
- ▓ Hang Gliding
- ▓ Pilot Aircraft
- ▓ Sky Diving
- ▓ Hot Air Ballooning
- ▓ Race Motor Vehicle
- Other hazardous activities [              ]

☒ No hazardous activities

[Previous] [Continue]

FIG. 18

HIPAA Authorization

You earlier expressed an interest in receiving a life insurance quote using the information provided during this health fair. Without your authorization, we cannot release identifiable health information about you to the insurer, and the insurer will be unable to provide you a quote.

By clicking the "Authorization Granted" button below, you will be authorizing us to release the information you provide to us during this health fair to ABC Life Insurance Company, its representatives and its reinsurers (jointly "ABC Life") for purposes of evaluating you for life insurance and for purposes of reinsurance. Your authorization will remain in effect only during this health fair unless earlier revoked.

If you provide your authorization, we will immediately release your information to ABC Life, and it will provide you with a preliminary insurance quote on the next screen. If you express your continued interest in life insurance after reviewing the quote, we will continue to share with ABC Life the information you provide to us during this health fair, but only for the duration of this health fair.

If at any time you decide you are not interested in insurance, you may notify one of our technicians of your decision. We will then consider your authorization revoke, will record the revocation in our database, and will not share any additional information with ABC Life.

Once information is disclosed to ABC Life, it is possible that they may re-disclose the information without being subject to limitations in the federal Privacy Rule. ABC Life's privacy obligations to you will be set forth in its insurance application. You may click on the hyperlink to the right to see these privacy obligations.

[Authorization Denied] [Authorization Granted]

If you provide your authorization, this screen will be printed and provided to you in writing along with your health profile.

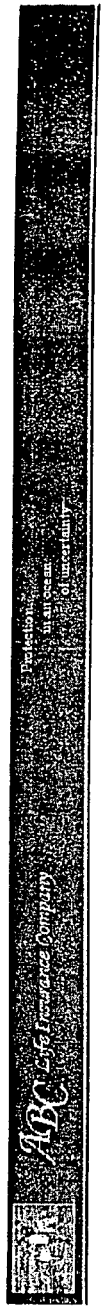

FIG. 21

MIB Authorization

I authorize any health care provider, pharmacy, and consumer reporting agency, including the Medical Information Bureau, to release medical or financial information about me to you for purposes of providing me with an insurance quote. I also authorize you to share any information provided by or about me during this session to your reinsurers and the Medical Information Bureau. Both of these authorizations are irrevocable and valid for 30 days from today.

Fraud Warning

Any person who submits an insurance application with the intent to defraud, or helps commit a fraud against an insurance company, is guilty of a crime.

*Do you accept all of the terms of the preceding authorization? If you choose NO, we will not be able to complete the insurance application process. If you choose YES, this will authorize ABC Life to contact MIB, etc ....... and fraud acknowledgement...*

[Decline]  [I Understand and Accept]

Thank You

Thank you for completing your personal information. Please go to Station 2 for additional processing.

Previous Continue

FIG. 22

User List for Lab Technician

| Status | Name | Birth Date |
|---|---|---|
| 🔔 | Higgins, Mike | August 26, 1950 |
| 🔔 | Manning, Peyton | November 11, 1971 |
| | Smith, Greg | December 12, 1972 |

[Refresh] [Continue] [Print Specific] [Manage Devices]

FIG. 23

Additional Information for Greg S Smith

Blood Pressure* [110] / [70]

Height* [5] feet [10] inches

Weight* [160] lbs

Pulse Rate* [60]    Pattern*  ● Regular  ○ Irregular

[Previous]  [Continue]

FIG. 24

Directions

Thank you for your continued interest in applying for life insurance. The results of the blood and saliva tests you completed for your health profile should be available in about 5 minutes. We will complete our underwriting for insurance purposes at that time and hopefully offer you a final premium quote for your consideration. To make use of your time while you wait, we recommend that you review a preliminary insurance application we've compiled from the answers you provided earlier during the health fair. We will also ask you for information we need to complete your application (e.g., the names of those who you'd like to receive death benefits). During this process, you will be alerted as soon as your final quote is available.

You may decide not to proceed with this application at any time.

Final Rate Quote of Super Preferred for Greg S Smith

Term Period: ◉ 10 Year  ◉ 20 Year

| Coverage Amount | Monthly | Yearly |
|---|---|---|
| $100,000 | 1.65 | 19.00 |
| $200,000 | 3.30 | 38.00 |
| $300,000 | 4.95 | 57.00 |
| $400,000 | 6.61 | 76.00 |
| $500,000 | 8.26 | 95.00 |

Do you want to enter the amount you want to pay each month?  ◉ Yes  ◉ No

Do you wish to purchase this insurance?  ◉ Yes  ◉ No

FIG. 32

Payment Information for Greg S Smith

*Earlier, you chose a policy of $200,000.00 for 10 years. A monthly payment would be $3.30 and an annual payment would be $38.00*

Most customers prefer to have their premiums deducted automatically from their checking or savings account each month.

Which method of payment would you prefer?*

◉ Automatic monthly check debit for $3.30   ◉ Annual payment by check for $38.00

[Previous] [Continue]

FIG. 33

Complete Your Application

You are now ready to sign and print your insurance application. You may preview it if you'd like by clicking on the button below.

Preview

Once you are satisfied that your application is accurate, you may sign your application and submit it to ABC Life Insurance Company today or you may print this application without signing it and submit it at a later date.

Do you wish to sign and submit your application today?  Yes  No Sign your application by typing your name in the box below. By typing your name in the box, you will be affirming the accuracy of the information contained in your application. Upon completing this signature process, you will be provided with a paper copy of the application with your name inserted into the signature block as evidence of your signature.

Signature (first, middle, last)* | Greg | S | Smith |

Previous Continue

FIG. 35

Thank You
Thank you for your application. Consider it submitted. A completed copy of your application is printing nearby. Please take it home for your records.
Your policy will be issued within 5 business days.
FIG. 36

AUTOMATED SYSTEM AND METHOD FOR EVALUATING INSURABLE RISKS AT POINT OF SALE

TECHNICAL FIELD

The present invention relates generally to evaluation of risks. In certain embodiments, the invention relates to an automated method and/or system for evaluating risks at the point-of-sale, and for providing a binding offer for an insurance product to cover such risks. In one embodiment, the invention is particularly applicable in the field of mortality (life) insurance.

BACKGROUND AND SUMMARY

An array of insurance products are available in the market place. One class of products may be described as "fully underwritten" products. That is, the parameters and costs of coverage are determined by an underwriter (usually having a relatively high degree of expertise and experience) after evaluating information from various sources and of varying types. Fully-underwritten products are typically used when face values of coverages are relatively large, or when an insurer is attempting to price products precisely by collecting and evaluating more information relating to the underlying risks.

Other types of insurance products are so called "simplified-issue" products. Such products may be priced and issued based upon relatively little information, and with relatively little involvement on the part of a professional underwriter. Such products may be limited to smaller face values, and may be limited in duration, as well. The pricing of such products is less precise and, when compared to a comparable, fully-underwritten product, usually relatively higher. This is a result of the additional uncertainty faced by the insurer in the absence of additional information relating to the subject risk, and a reflection of the often lower quality of the information evaluated. Such products may also be referred to as "instant-issue" or "immediate-issue" products.

FIG. 1 is a graph which illustrates a mortality comparison for a particular class of insured individuals covered by products that are fully underwritten and non-fully underwritten. Line 10 indicates the expected mortality of a particular class of insureds covered by a fully-underwritten product. That is, the application process involves collecting information (such as examination by a medical professional or paraprofessional, urine specimen, blood profile, etc.) over and above that typically submitted on an insurance application by each of the insured individuals. The information is then evaluated by an underwriter, or according to criteria developed by an underwriter, prior to specifying and pricing an applicable insurance product.

With continued reference to FIG. 1, line 12 illustrates the expected mortality of the same class of insureds when no medical information is available. Due to the higher mortality experienced with this group, the pricing and profitability of comparable insurance policies covering individuals in these two groups differ substantially.

Other insurance products may be characterized by similar comparisons. For instance, auto insurance coverage for certain individuals and/or with certain features and coverage limits may be offered with, or without, the benefit of information from sources other than the applicant. Property and casualty insurance products, and other types of insurance products may be similarly designed and priced. Advantages of products which are fully underwritten (or at least relatively so) are more precision and less uncertainty with regard to occurrence of the event insured against, greater profitability to the insurer and the ability to more competitively price products. Disadvantages include the time required and expense associated with obtaining the information required for the full underwriting process.

Advantages of the simplified issue products include the ease and relatively low cost associated with collecting the limited amount of information considered by the insurer. As discussed above, disadvantages include a higher probability of occurrence of the event insured against, and associated pricing and profitability ramifications.

There exists a need for methods and systems for evaluating risks, and for providing insurance products to cover risks, which combine the ease and convenience of simplified-issue products with the precision and advantageous features of fully-underwritten products.

The remainder of this disclosure describes such systems and methods. For purposes of illustration only, a method and system are described in the context of life insurance. However, the invention in its broader forms is not limited to this particular application. While the subject system and method may provide particular advantages in the field of life and/or health insurance, similar techniques may also be applied in other contexts (e.g., property and casualty insurance, automobile insurance, etc.).

One embodiment of the present invention comprises an automated method of evaluating an insurable risk and providing an immediate binding insurance offer to cover that risk. The automated method comprises the steps of collecting self-reported information relating to the risk from an applicant, collecting objective information relating to the risk, providing the self-reported information and the objective information to an automated underwriting system, evaluating and rating the risk using the automated underwriting system, and providing an insurance offer relating to a specific insurance product for review and acceptance by the applicant. The method may also include the step of obtaining, via electronic means, consent from the applicant to provide the self-reported and objective information to the automated underwriting system. An additional step of obtaining an electronic authorization from the applicant for the immediate release of objective information from at least one of a health care provider, pharmacy or pharmacy benefit manager, a consumer reporting agency and the Medical Information Bureau, and for evaluation of such objective information by the automated underwriting system may also be provided.

Certain embodiments of the invention further comprise the step of producing a preliminary rate quote for the applicant based upon the self-reported information. Information gathering apparatus may be provided for the applicant's use in reporting the self-reported information. That apparatus may include at least one of a keyboard, a display, a touch screen display, and a pointing device. The information gathering apparatus may further include an automated application to elicit the self-reported information from the applicant. The automated application has, in certain embodiments, multiple screens and multiple levels of screens for eliciting the self-reported information. At least one of the screens presented to the applicant in at least one of the multiple levels is selected in response to information reported by the applicant in a preceding level.

The self-reported information may include at least one of age, address, citizenship, medical history, family medical history, nicotine usage, alcohol usage, drug usage, motor vehicle information, aviation information, and hazardous activities information. The objective information may include at least one of height and weight, blood pressure, pulse rate, blood cholesterol, blood glucose, evidence of drug usage, HIV exposure, tumor markers, evidence of tobacco usage, lung capacity, evidence of kidney disease, information from the Medical Information Bureau, information relating to prescribed drugs, consumer credit information, and motor vehicle information.

Certain embodiments of the subject method include the step of collecting information relating to a beneficiary of the insurance product. These and other embodiments may further include the step of producing an immediate, final rate quote for the applicant based upon the self-reported and objective information. An insurance application relating to the insurance product may also be provided. Payment information may be collected from the applicant for the insurance product if the final rate quote is accepted. Provision may be made for obtaining an electronic signature from the applicant, and for producing a printed copy of the application and providing the copy to the applicant.

Another embodiment of the present invention comprises a system for evaluating an insurance risk and providing an immediate binding insurance offer to cover that risk. The system comprises means for collecting self-reported information relating to the risk from an applicant, means for collecting objective information relating to the risk, an automated underwriting program, and means for providing the self-reported information and the objective information to the automated underwriting program. The automated underwriting program evaluates and rates the insurable risk and produces a binding insurance rate quote relating to an insurance product to cover the risk.

In this and other embodiments, the means for collecting self-reported information may include an automated application, an information gathering apparatus, such as a keyboard, a display, a touch screen display, a pointing device, or other devices used for entering information into a computing device. The automated application may include multiple screens and multiple levels. At least one of the screens presented to the applicant in at least one of the levels is selected in response to information reported by the applicant in a preceding level.

The self-reported information includes the same type of information referred to above in connection with the automated method. The means for collecting information comprises various pieces of apparatus for collecting the same type of objective information referred to above. Some apparatus may be manually operated, and may be used by a technician. The information produced is then manually inputted into the system by the technician. Alternatively, apparatus which automatically gathers the objective information, with or without active participation by the applicant, and which automatically communicates the information to the automated underwriting program, may also be used.

In these and other embodiments of the system, the means for collecting objective information may further comprise means for obtaining information from the Medical Information Bureau, and means for obtaining information relating to prescribed drugs, consumer credit information and motor vehicle information. The subject means may include databases maintained for these purposes, and digital communications networks for transmitting the information.

In certain embodiments of the system, the automated underwriting program produces a final rate quote for the applicant based upon the self-reported and objective information. An insurance application may be produced and displayed to the applicant, and a copy may be produced for the applicant's benefit.

One embodiment of the present invention comprises a system for evaluating an applicant for life insurance and for providing an immediate binding insurance offer for review and acceptance by the applicant. The subject system comprises information collecting apparatus for use by an applicant entering self-reported information, one or more stations for collecting objective information from the applicant, a processor, apparatus for communicating and inputting the self-reported and objective information to the processor, a display, and one or more input devices. The information collecting apparatus comprises at least a display, an automated life insurance application which can be viewed by the applicant using the display, and an input device for use by the applicant in entering the self-reported information. The processor hosts a life insurance underwriting program. The self-reported information and the objective information is communicated to the processor by one or more data communications links for use by the life insurance underwriting program. In certain embodiments, a preliminary report based on the self-reported information is displayed to the applicant, and a final quote based upon both the self-reported information and the objective information is subsequently displayed. The input device is provided for use by the applicant in acknowledging one or both of the quotes.

In some embodiments, the life insurance underwriting program provides an insurance application for review and acceptance by the applicant. Also in certain embodiments, the one or more stations for collecting objective information includes at least one of the following: apparatus for measuring height and weight; apparatus for measuring blood pressure; apparatus for measuring pulse rate; apparatus for measuring blood cholesterol; apparatus for measuring blood glucose; apparatus for detecting evidence of drug usage; apparatus for detecting HIV exposure; apparatus for detecting tumor markers; apparatus for detecting evidence of tobacco usage; apparatus for measuring lung capacity; and apparatus for detecting evidence of kidney disease. Apparatus may also be provided for obtaining information from the Medical Information Bureau, obtaining information relating to prescribed drugs, obtaining consumer credit information and/or obtaining motor vehicle information.

One embodiment of the invention comprises a computer based system for capturing data at a point of sale relating to mortality or morbidity risk assessment, and a related insurance product. The computer based system comprises a processor, a memory, an input device, a plurality of stations for collecting medical and/or physical data relating to the applicant, and at least one data communications link connecting the stations to the processor. The processor is programmed to receive the medical and/or physical data via the data communications link, and to store the received data in the memory. The input device is connected to the processor for use in entering data relating to an applicant, including the applicant's age, for storage in the memory. The data communications link may be a wired or wireless link.

Certain embodiments comprise a risk assessment program for assessing a mortality or morbidity insurance risk using the stored data in the memory. A data communication link may be provided for use by the processor in transmitting the data stored in the memory to the mortality or morbidity risk assessment system, and for receiving a risk assessment from the system. The system may further comprise a program for generating a life insurance policy using the information stored in the memory, means for confirming an identity of the applicant, and means for receiving an electronic signature of the applicant.

One or more of the plurality of stations for collecting medical and/or physical data relating to the applicant may include apparatus for analyzing and/or measuring various factors. For example, one or more of the stations may include apparatus for analyzing saliva, blood, urine and hair samples. One or more of the stations may further comprise apparatus for measuring blood cholesterol, blood glucose, blood pressure, heart rate and lung capacity. Further, one or more of the stations may include apparatus for detecting drug or tobacco usage, tumor markers, exposure to HIV and/or kidney disease. One or more of the stations may include apparatus for measuring weight and height of the applicant.

Additional embodiments, features and advantages will become apparent to those skilled in the art upon consideration of the following detailed description of the illustrated embodiments exemplifying the best mode of carrying out the invention as presently perceived.

BRIEF DESCRIPTION OF DRAWINGS

The present disclosure will be described hereafter with reference to the attached drawings which are given as non-limiting examples only, in which:

FIGS. 8-36 are illustrative screens from one embodiment of the system and method of the present invention.

Figure 1:
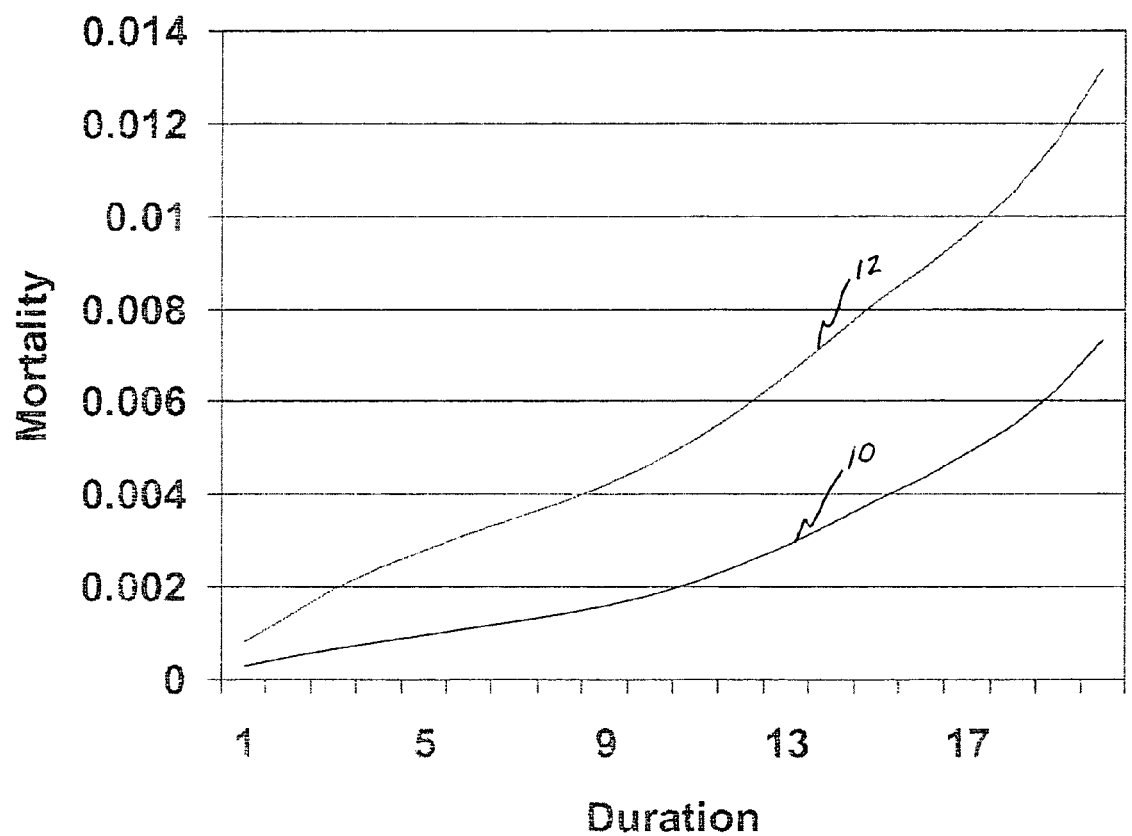
FIG. 1 is a graph which illustrates a mortality comparison for a particular class of insured individuals covered by fully-underwritten and simplified-issue insurance products.

Corresponding reference characters indicate corresponding parts throughout the several views. The discussion which follows is intended to illustrate embodiments of the subject method and system, and is not intended to and should not be construed as limiting the scope of the subject invention. The scope of the invention is defined by the claims which follow this description.

DETAILED DESCRIPTION OF THE DRAWINGS

Figure 2:
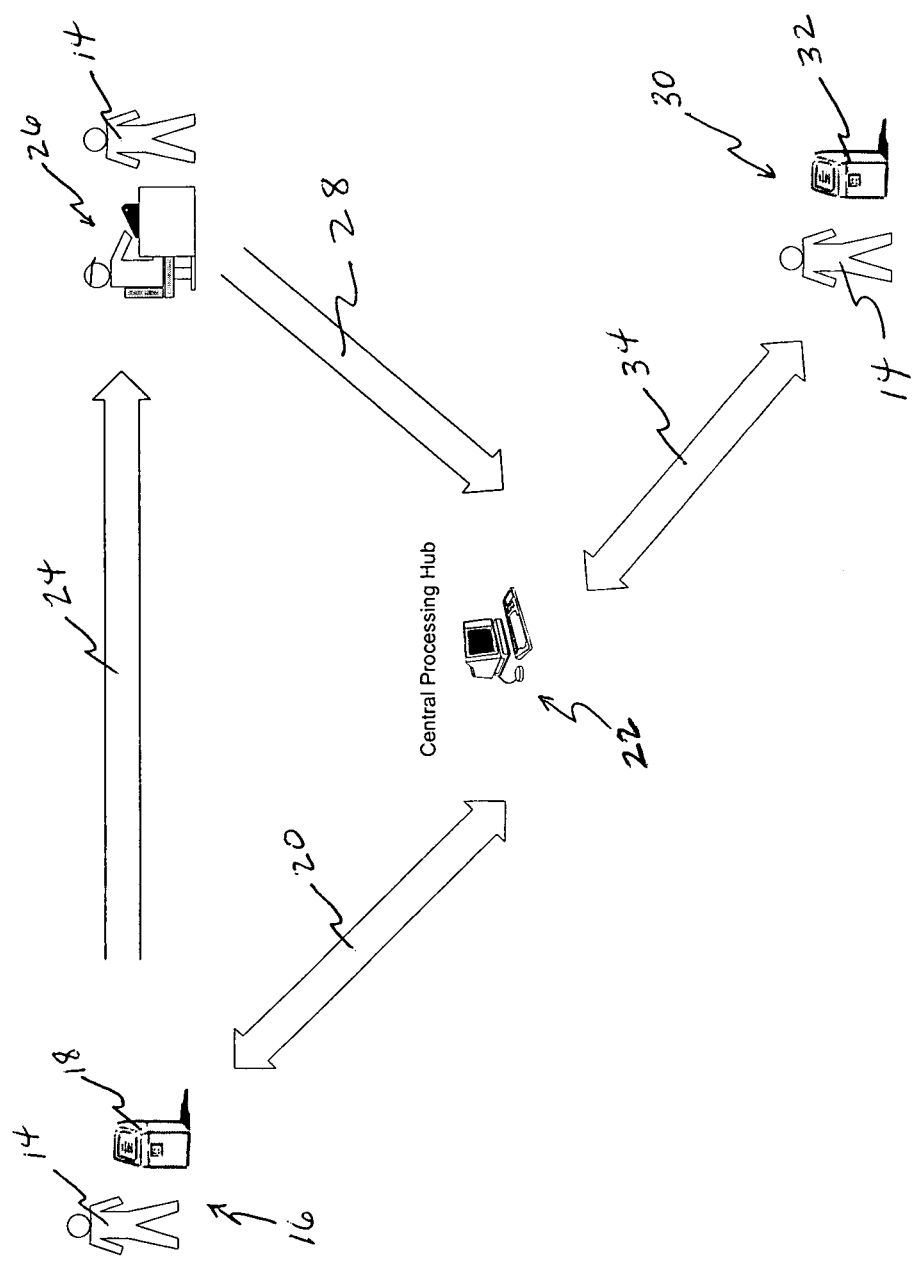
FIG. 2 is a flow diagram which illustrates operation of one embodiment of the system and method of the present invention.

FIG. 2 shows a schematic representation of one embodiment of a system constructed in accordance with the present invention. In FIG. 2 an applicant 14 is shown at a terminal 18 located at a station 16, which may be one of several stations. Terminal 18 includes a display, and an input device for use by applicant 14. The input device may be a keyboard, a touch screen display, a pointing device, or any such equivalent device. Using the input device, applicant 14 self-reports medical and other personal information, preferably by means of an automated application form. The self-reported information may include the applicant's age, address, citizenship, medical history, family medical history, nicotine usage, alcohol usage, drug usage, motor vehicle information, aviation information, and hazardous activities information. Such information may be gathered from applicant 14 by means of an automated application which is specifically designed to illicit such self-reported information from the participant. Examples of screens from an automated application are illustrated and discussed in additional detail below. The automated application may include multiple screens and multiple levels for eliciting the self-reported information from the participant. As will be discussed in additional detail below, at least one of the screens presented to the participant in at least one of the multiple levels is selected in response to information reported by the participant in a preceding level. The application further includes a decision-making ability which provides for presenting additional screens to applicant 14 in response to information previously inputted by applicant 14.

In addition to the self-report information, applicant 14 may also provide, via terminal 18, certain consents and authorizations. For example, a consent may be obtained from applicant 14 which allows the system to forward the self-reported information from terminal 18 to other parts of the system. (Specifically, an automated underwriting system, as discussed below). Authorizations may also be obtained, via terminal 18, from applicant 14 for the immediate release of information from a health care provider, a pharmacy or pharmacy benefit manager, a consumer reporting agency or other information sources, such as the Medical Information Bureau. Consents are obtained, if necessary, for use of such objective information by the system.

Terminal 18 is connected, via data communications link 20, to a processor 22. Processor 22 may be a general purpose computing system which includes a central processing unit, a memory, input devices, a display, and output devices. An automated underwriting system capable of evaluating and rating insurable risks is resident in the memory of processor 22. An example of an underwriting system is shown in U.S. Pat. No. 4,975,840 which is assigned to the present Assignee. To the extent necessary for a complete understanding of the system of FIG. 2, elements of that patent are hereby expressly incorporated herein by this reference thereto. However, the system of FIG. 2 is not intended to be limited to use only with the automated underwriting system shown in that patent.

In certain embodiments, a preliminary rate quote may be prepared by processor 22 and transmitted to terminal 18 for review by participant 14 based upon the self-reported information. An example of such a preliminary quote is discussed in additional detail below in connection with FIG. 4, and an illustrative example is shown in FIG. 2.

Data communications link 20 is preferably a two-way link, allowing information to flow from terminal 18 to processor 22, and vice versa. Link 20 may be a "wired" link (for instance, cable, coaxial cable, fiber optic cable, or other physical connection). Alternatively, link 20 may be a wireless data communications link. It should also be understood that more than one link 20 may be provided to connect terminal 18 to processor 22 or to connect additional terminals to processor 22 and/or other comparable processors. Processor 22 may be located in the general vicinity of terminal 18 and other elements of the subject system. Alternatively, processor 22 may be remotely located. The specific location of server 22 relative to terminal 18 and other elements of the system is not critical.

Assuming proper authorizations have been obtained, either terminal 18 or processor 22 may initiate orders for third party information via, for instance, the Internet. Such information, when received, is stored in a memory element of processor 22 along with the information entered to terminal 18 by the participant.

After entering the self-reported information, consents and authorizations via terminal 18, applicant 14 proceeds as indicated by arrow 24 to a second station, generally identified by reference numeral 26. At station 2, objective information about applicant 14 is collected. Although a single station is shown in the illustration of FIG. 2, multiple stations may be provided in certain embodiments of the system.

At station 26, objective information is collected from applicant 14 by one or more technicians, or by one or more self- or technician-operated devices, such as those described in additional detail below. The technician may be a medical professional or paraprofessional. Objective information is collected from applicant 14, including one or more of the following: height and weight, blood pressure, pulse rate, blood cholesterol, blood glucose, evidence of drug usage, HIV exposure or tumor markers, evidence of tobacco usage, lung capacity, evidence of kidney disease. A technician may also initiate collection of information from the Medical Information Bureau, information relating to prescribed drugs, consumer credit information, and motor vehicle information.

As or after the objective information is collected, the information is transmitted to processor 22 by data communications links, generally represented in FIG. 2 by arrow 28. As is the case with data communications link 20, data communications link 28 may be wired or wireless. Certain elements of the information may be collected by one or more technicians and physically inputted into the system, such as by a keyboard or other input device. For example, a professional or paraprofessional may measure applicant's height and weight, record blood pressure and pulse rate, draw blood, collect saliva and/or urine specimens, and gather other objective information. Such information may be entered by the technician and transmitted to processor 22 by a data communications link 28. Alternatively, some of the instrumentation and/or devices used in collecting the information may be directly connected via common or separate communication links to processor 22. Examples of devices used to collect such objective information are discussed below in connection with FIG. 3.

Following the collection of objective information at station 26 (and/or other stations), applicant 14 proceeds to the station generally identified in FIG. 2 by reference numeral 30. Another terminal 32 is provided at station 30. Using terminal 32, applicant 14 may review and amend any of the self-report information originally entered via terminal 18. Terminal 32 is connected by two-way data communications link(s) 34 with processor 22. Any changes entered via terminal 32 by applicant 14 are transmitted to processor 22 for use by the automated underwriting system. After any changes are entered, and after the automated underwriting system of processor 22 has evaluated all the self-report and objection information transmitted to processor 22, the system provides an insurance offer relating to a specific insurance product. The offer may be displayed by terminal 32 for review and acceptance by the applicant. Additionally or alternatively, the offer may be printed and provided to applicant 14. In one embodiment, applicant 14 may accept the offer by electronic signature, and authorize payment for the insurance product by credit card, debit card, electronic funds transfer, or similar means.

Figure 3:
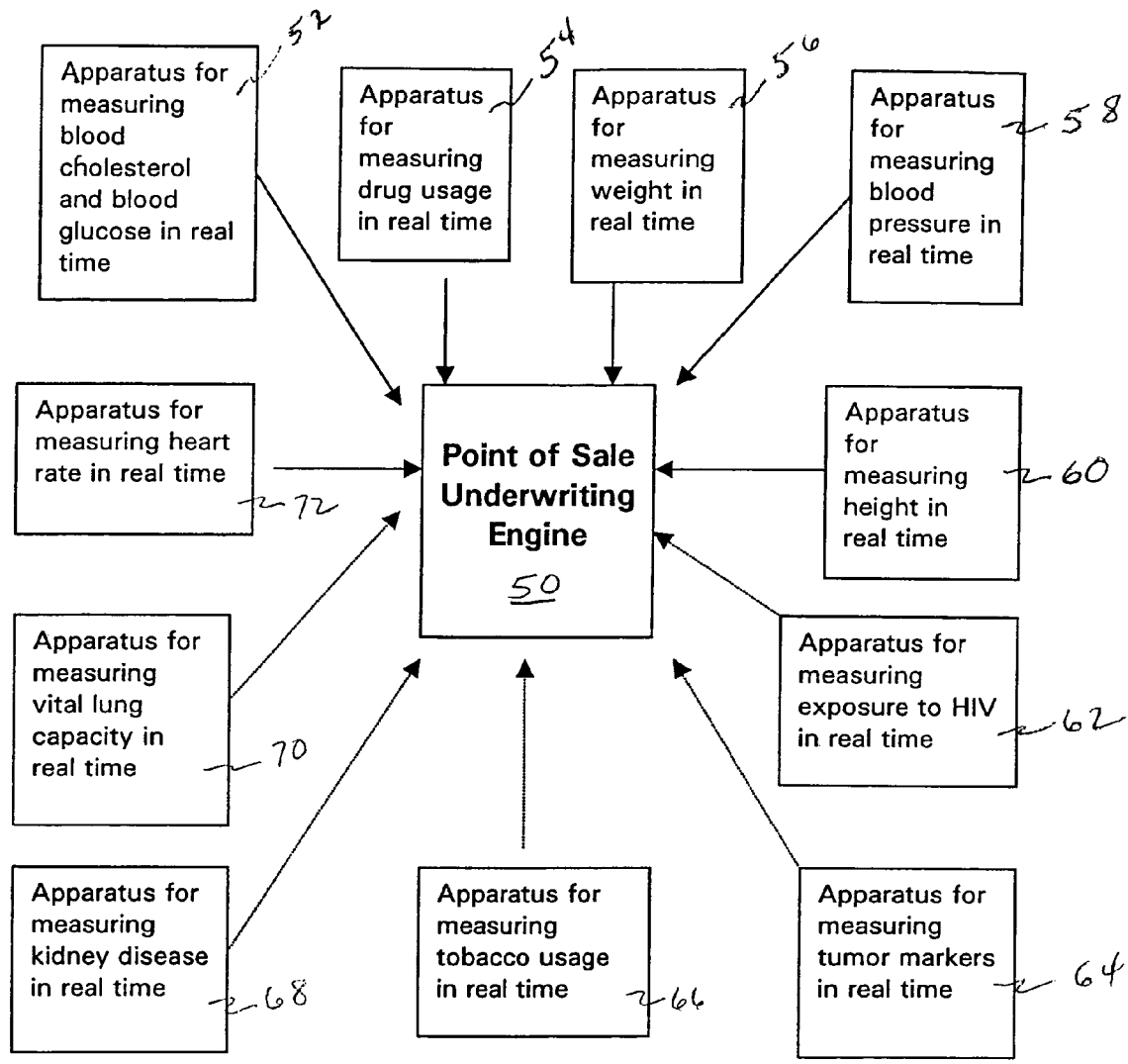
FIG. 3 is a block diagram which further illustrates apparatus used in the system and method of FIG. 2.

FIG. 3 is a block diagram which further illustrates some of the apparatus used in the arrangement of FIG. 2. Specifically, block 50 illustrates the automated risk assessment/underwriting program operated in conjunction with processor 22. Various apparatus are presently available which may be used to gather objective information relating to an applicant, and communicate that information to automated underwriting program 50 "in real time." That is, the information is obtained from the applicant, with or without the aid of a technician, and transmitted to the automated underwriter substantially instantaneously, or in a relatively short period of time. Examples of such apparatus include a Cholestech LDX analyzer for measuring blood cholesterol and blood glucose levels from a drop of blood in approximately 5 minutes. This device is manufactured by and available from Cholestech LDX Corporation of Hayward, Calif. Another device which may be used in the subject system and method is the UPlink oral fluid analyzer manufactured by OraSure Technologies, Inc. of Bethlehem, Pa. This device measures the presence in saliva of drugs of abuse. This or a similar device may also be used to detect the presence of cotinine, an indicator of nicotine usage, in a number of minutes.

Similar devices and/or other more conventional techniques may be used to collect objective information relating to the applicant's height and weight, blood pressure, pulse rate, blood cholesterol, blood glucose, evidence of drug usage, HIV exposure, tumor markers, evidence of tobacco usage, lung capacity and evidence of kidney disease. Information from the Medical Information Bureau, information relating to prescribed drugs, consumer credit information, motor vehicle information or other relevant information may also be obtained by the generation of automatic requests, or through action of the technician. Blocks 52-72 of FIG. 3 schematically represent the devices and/or actions taken to gather this objective information for use by automated underwriting program 50.

Figure 4:
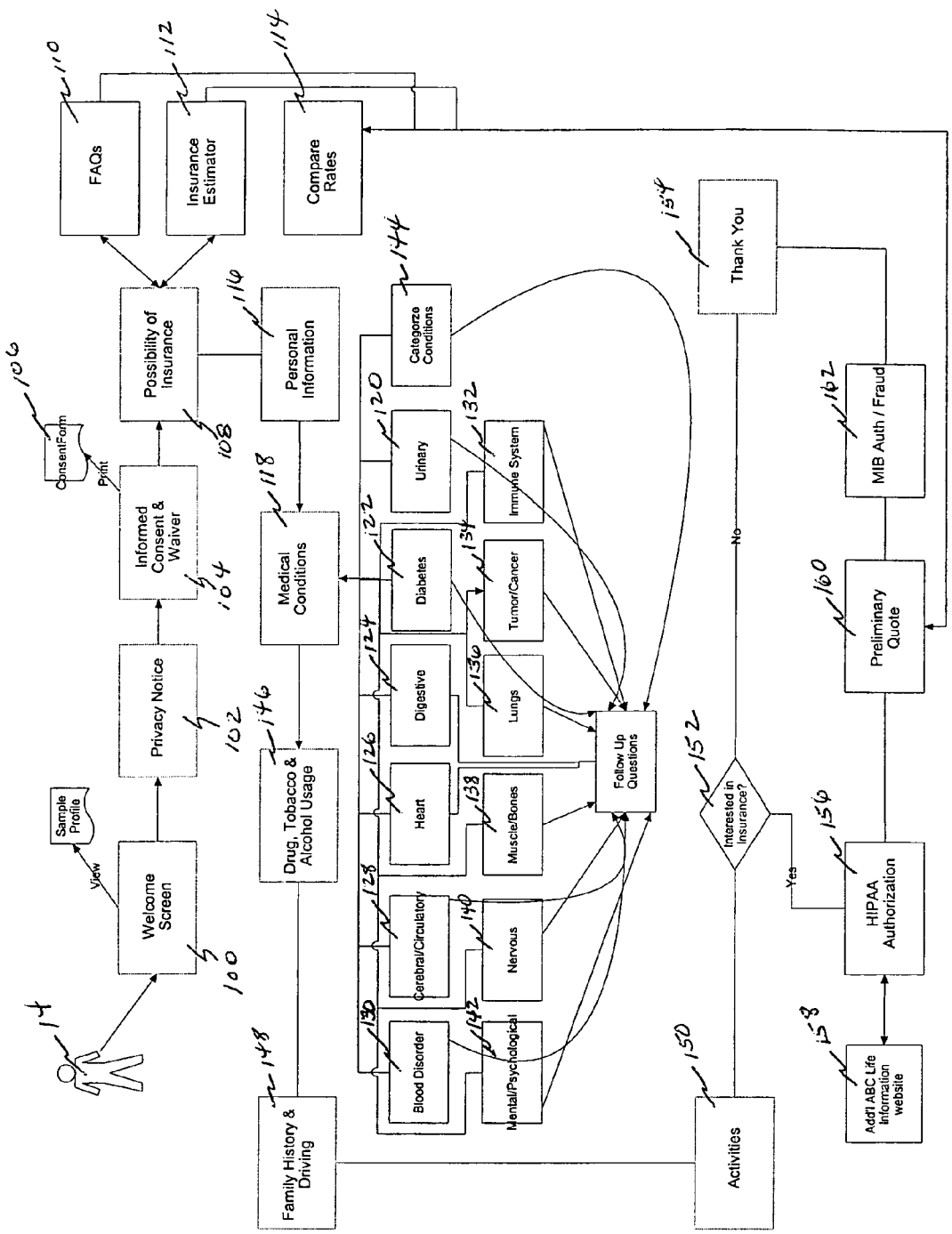
FIG. 4 is a flow chart which illustrates a portion of the system and method of FIG. 2.

FIG. 4 shows a flow chart which illustrates the interactions which occur between applicant 14 and an illustrative embodiment of terminal 18 of FIG. 2. Applicant 14 is greeted by a welcome screen represented by block 100. One example of a welcome screen is shown in FIG. 8. The screen may provide instructions to the applicant and may allow the applicant to view a sample profile illustrating in additional detail the kind of information requested by the system.

Should the applicant choose to continue, a privacy notice will be displayed (block 102). An example of a privacy notice is shown in FIG. 9. If the applicant opts to continue, a waiver and consent form is obtained (block 104). An example of a consent and waiver form is illustrated in FIG. 10. Should the applicant choose to continue, a copy of the form is printed to be retained by the applicant (block 106).

In one embodiment of the invention, the subject system may be used in connection with a "health fair" or other event designed to provide health information to applicant 14. Purchase of insurance is not mandatory for participation. However, in the embodiment illustrated, applicant 14 is presented with a screen which requests an indication of possible interest in purchasing a life insurance product (block 108). Access to additional information, by way of a "FAQs" screen, an insurance estimator, and/or a rate comparator, may be provided to applicant 14 at this or some other juncture (blocks 110-114).

Figure 15:

In the illustrated embodiment, the next screen presented to applicant 14 solicits personal information. The screen is represented in FIG. 4 by block 116. An example of one such screen is shown in FIG. 11. Following the entry of personal information, the system requests entry on medical conditions (block 118). An example of a screen which requests such information is shown in FIG. 12. This portion of the system, which may be described as an automated application, includes multiple levels. For example, if applicant 14 indicates, with reference to FIG. 12, the existence of a lung condition in the recent past, the system will request additional information, as illustrated in FIG. 13. If, in response to the request for additional information, applicant 14 indicates the presence of asthma, additional follow-up questions are asked, as illustrated by FIG. 14. Similar screens may be provided for other conditions listed in FIG. 12, and illustrated in FIG. 4 by blocks 120-142. Additional conditions may be added, or any of the illustrated conditions may be deleted, as desired. Further, an additional screen may be provided, as illustrated by block 144, to assist an applicant in categorizing other conditions. A sample screen for this purpose is shown in FIG. 15.

Following entry of information relating to medical conditions, a screen requests information from applicant 14 regarding drug, tobacco and alcohol usage (block 146). A sample screen used for this purpose is shown in FIG. 16. A subsequent screen, represented by block 148, requests information on family medical history and driving record. An example of one such screen is shown in FIG. 17. Finally, a screen represented by block 150 requests information relating to participation in hazardous activities. An example of one such screen is shown in FIG. 18.

Following entry of this information by applicant 14, the system confirms continued interest in obtaining insurance (decision block 152). If applicant 14 is not interested, a termination or "thank you" screen is displayed (block 154). If applicant 14 is interested, an authorization is requested regarding disclosure of the information entered (block 156). An example of an authorization screen is shown in FIG. 19. Applicant 14 may also be provided with a link to additional information relating to the obligations of the insurer with regard to confidentiality and privacy (block 158).

Figure 20:
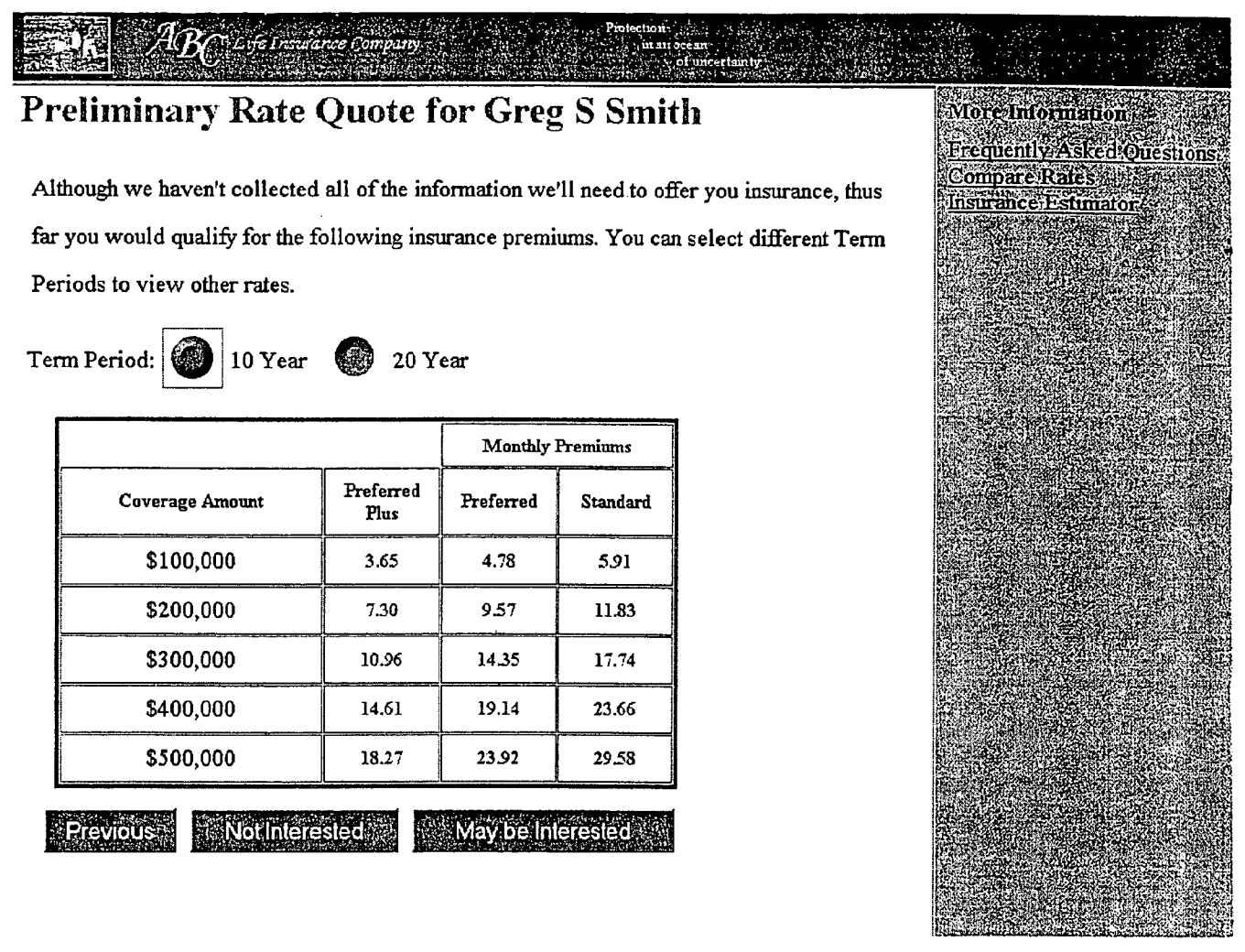

If authorization is granted, the system produces, with the aid of processor 22, a preliminary quote for insurance coverage based upon the information reported by applicant 14. This step is represented in FIG. 4 by block 160. A sample of a preliminary quote is shown in FIG. 20. In this screen, applicant 14 is again provided with links to additional information, as previously discussed in connection with blocks 110-114. If applicant 14 expresses continued interest, an "MIB" authorization is requested, and a fraud warning is provided, as represented by block 162 and illustrated in FIG. 21. This completes the interaction between applicant 14 and terminal 18. As indicated in FIG. 22, the "thank you" screen represented by block 154 is displayed and applicant 14 proceeds to station 26.

Figure 5:
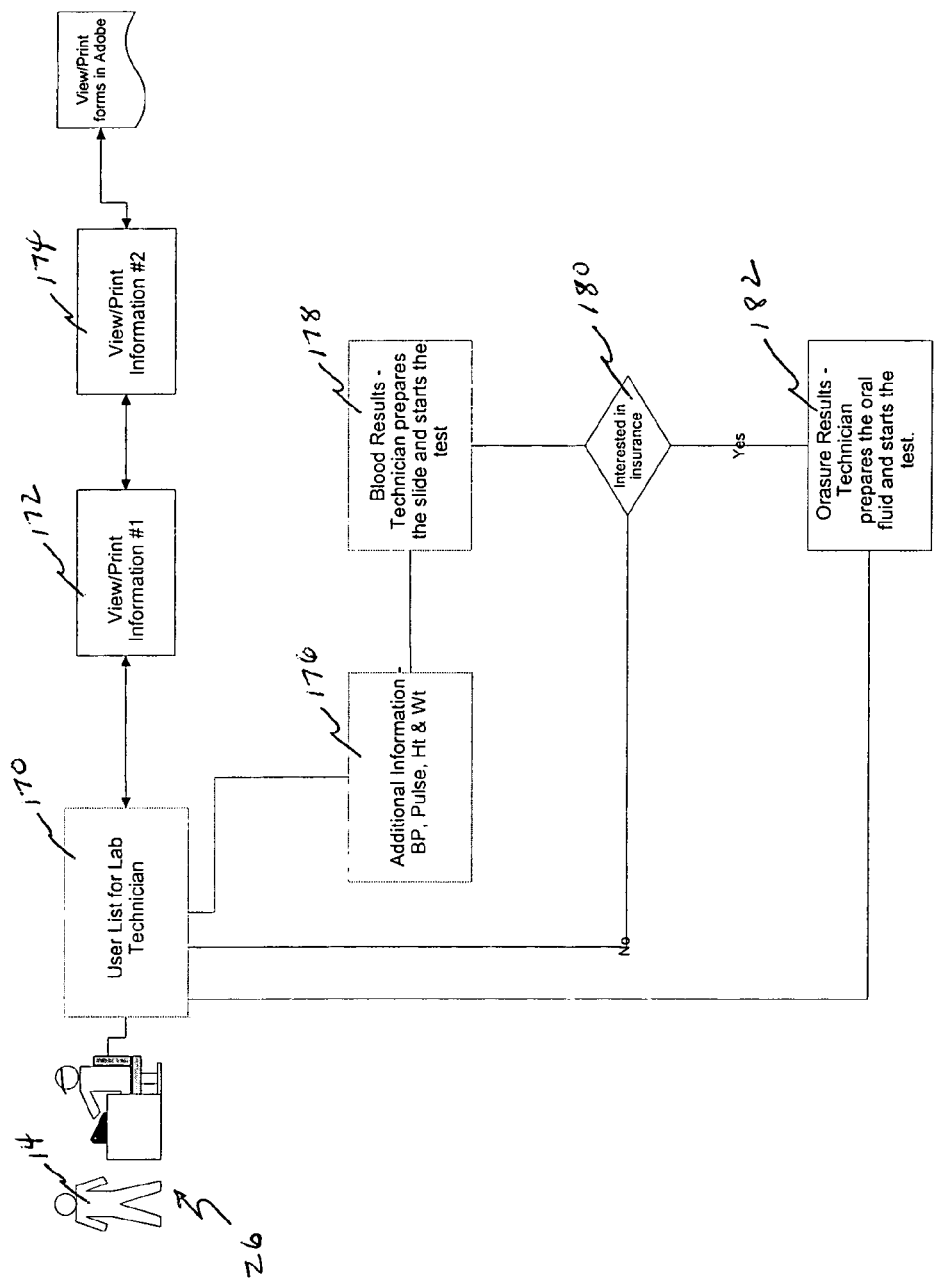
FIG. 5 is a flow chart which illustrates a further portion of the system and method of FIG. 2.

FIG. 5 is a flow chart which illustrates the interactions which occur at station 26 in one illustrative embodiment of the system of FIG. 2. A user list is produced for reference by a technician (block 170). An example of one such list is shown in FIG. 23. The technician selects the appropriate entry for applicant 14. Provisions may be made for the technician to view and/or print forms appropriate for a particular applicant (blocks 172 and 174).

Figure 25:
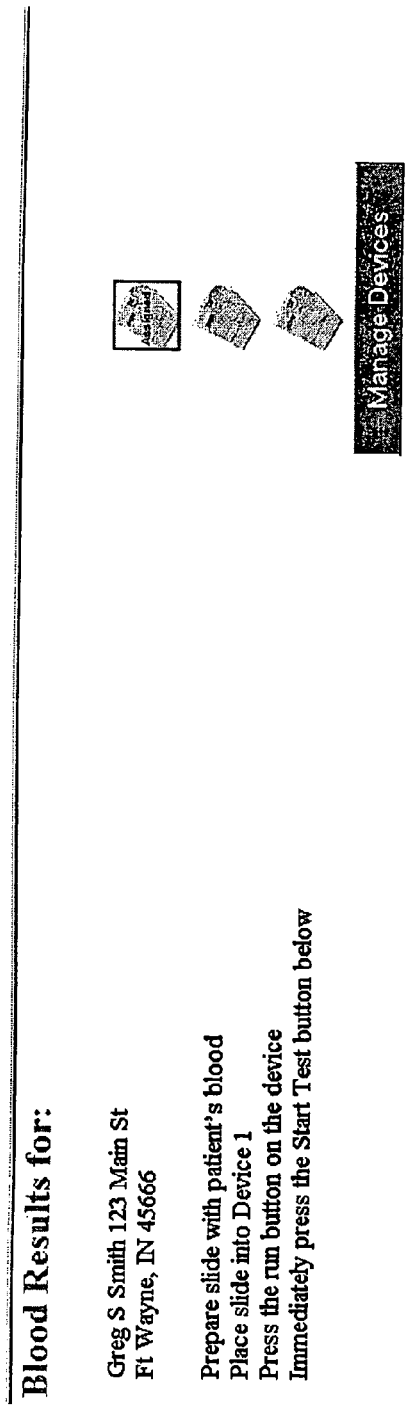

The technician collects additional information from applicant 14. This operation is represented generally by block 176. As previously discussed, such additional objective information may take many forms. Illustrated in FIG. 24 is a screen which allows the technician to enter applicant's blood pressure, height, weight and pulse rate. In addition, the technician may take a blood sample and prepare a slide for analysis by, for example, the Cholestech LDX device referenced above. (See FIG. 25).

This operation is generally represented by block 178. In the illustrated embodiment, an expression of continued interest in insurance is requested by the system, and a response may be entered by either applicant 14 or the technician (block 180). Assuming applicant 14 indicates continued interest, an oral fluid (saliva) specimen is gathered and analyzed (for example, by the OraSure UPlink device referred to above). This operation is represented by block 182 in FIG. 5.

Figure 6:
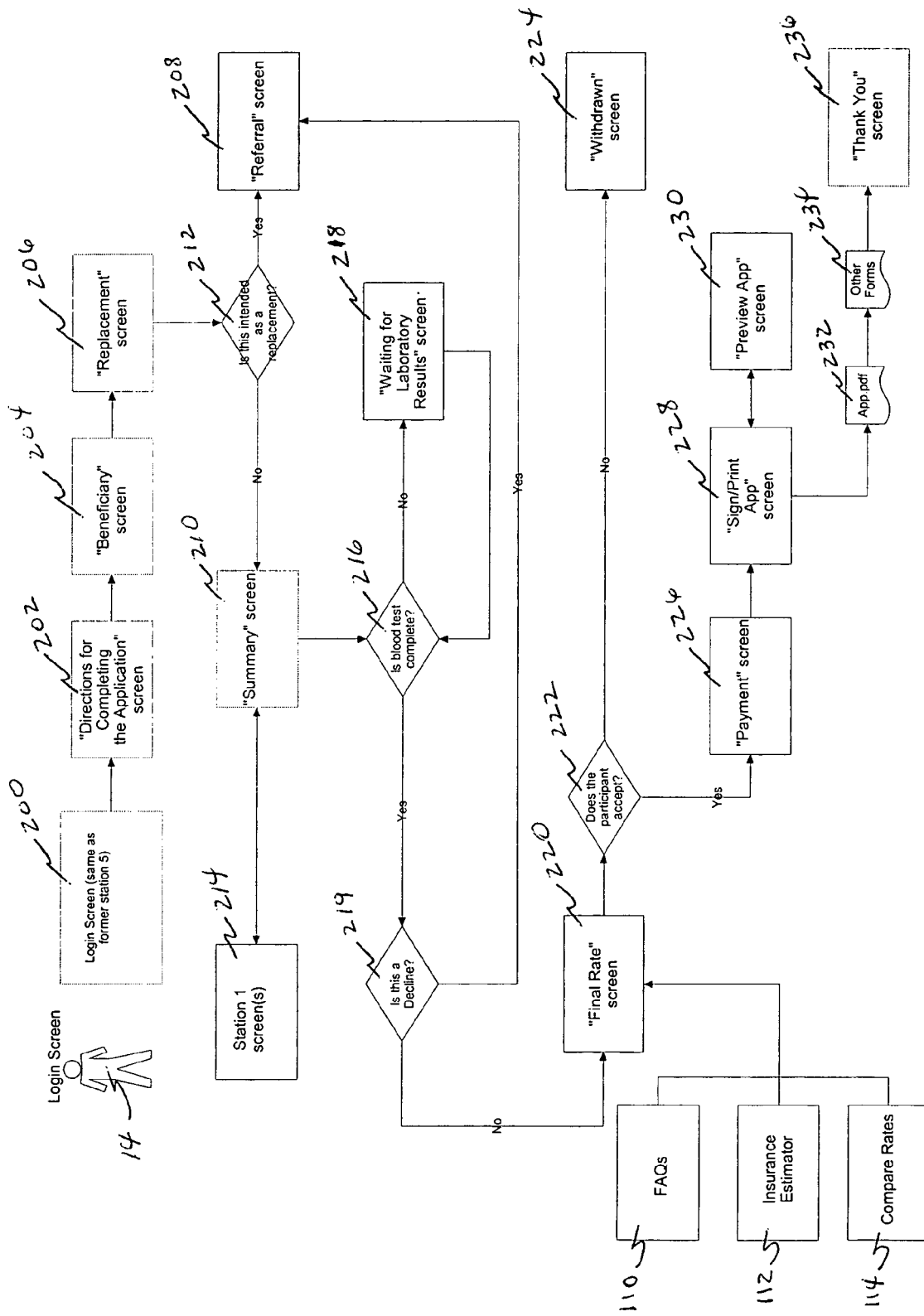
FIG. 6 is a flow chart which further illustrates a portion of the system and method of FIG. 2.
Figure 26:
Figure 28:
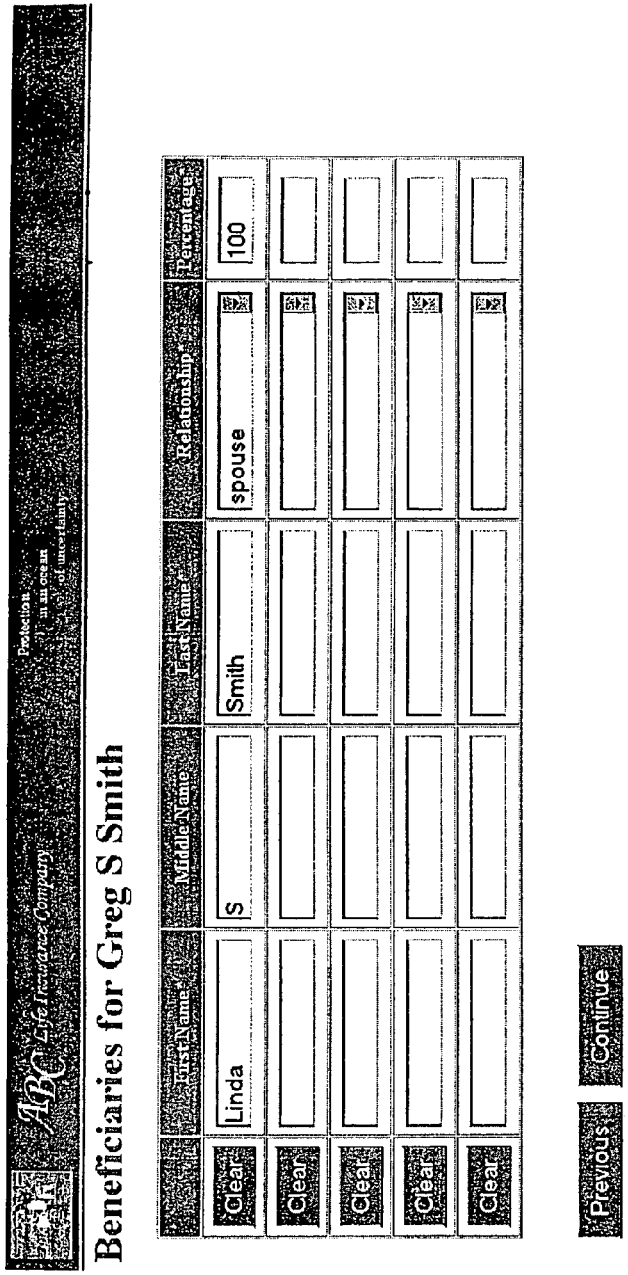
Figure 29:
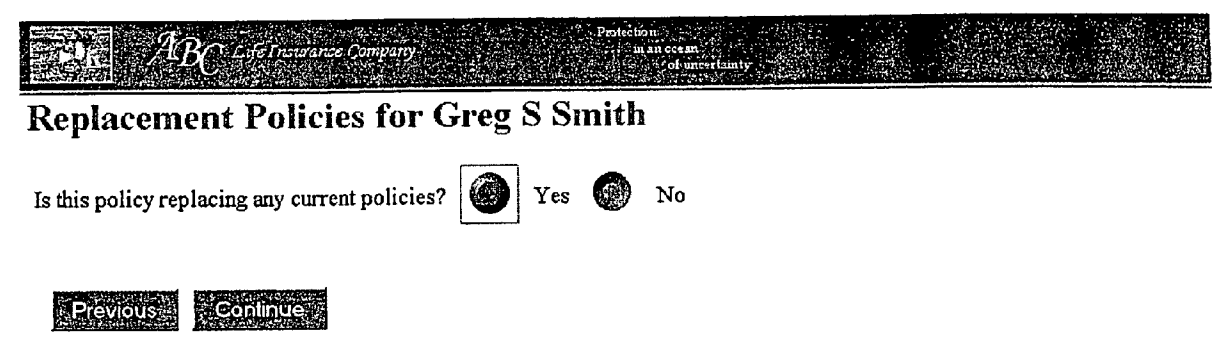

FIG. 6 is a flow chart which illustrates interactions which occur between applicant 14 and the system at station 30. The interactions begin with a login procedure, generally represented in FIG. 6 by block 200. A representative screen illustrating this step is shown in FIG. 26. Following login, applicant 14 receives directions for completing the application (block 202). One example of this type of screen is shown in FIG. 27. The system requests information regarding a beneficiary (block 204), and an indication of whether the subject policy is replacing any current policy (block 206). Sample screens for these purposes are shown in FIGS. 28 and 29.

Figure 30:

If applicant 14 indicates that the policy is intended as a replacement, the system generates a "referral" screen to refer applicant 14 to a live underwriter (block 208). If applicant 14 indicates that the policy is not a replacement policy, the system generates a summary of all information previously provided (block 210). These alternative courses are represented in the flow chart of FIG. 6 by decision block 212. A portion of the information presented in a "summary" screen is shown in FIG. 30. As indicated by the scroll bar on the right of this figure, additional information is contained in this screen. Applicant 14 is given an opportunity to edit any of the information presented on the summary screen. Pressing the edit "button" at the bottom of the screen will take applicant 14 to the appropriate screen where the applicable information may be edited. This operation is represented generally in FIG. 6 by block 214.

Figure 31:

The system periodically checks to see if the blood test and/or other "lab" analyses are complete. This operation is represented by decision block 216. If not, the system generates a screen which advises applicant 14 that the system is "waiting for laboratory results." This screen is represented in FIG. 6 by block 218, and a sample of such a screen is shown in FIG. 31. The system will continue checking periodically until the subject results are received. When received, the system determines whether the automatic underwriter has decided to decline or accept coverage. This operation is represented in FIG. 6 by decision block 219. If coverage is declined, the referral screen represented by block 208 is presented. If coverage is accepted, the system generates a final rate quote for applicant 14. This operation is represented in FIG. 6 by block 220. An illustrative final quote screen is shown in FIG. 32. This screen provides options for applicant 14 to select a term, coverage amount, or specify an amount he/she wishes to pay each month. The screen also asks whether applicant 14 wishes to purchase the subject coverage.

Figure 34:

The system determines whether applicant elects to purchase this insurance in a decision operation represented in FIG. 6 by block 222. If applicant 14 declines to purchase the insurance, a "withdrawn" screen is generated, as represented by block 224 in FIG. 6. If applicant 14 indicates a desire to purchase insurance, a payment screen is generated. This operation is represented by block 226 in FIG. 6, and an example of a "payment" screen is shown in FIG. 33. Following generation of the payment screen, the system displays the completed application and requests an electronic signature from applicant 14. This operation is represented by block 228 in FIG. 6, and an illustrative example of such a screen is shown in FIG. 34. Prior to "signing" the application by electronic signature, applicant 14 is given an opportunity to preview the completed application (block 230). Also, the completed application and any other associated forms may be printed from the server at this time, as indicated by blocks 232 and 234. If applicant 14 indicates a desire to sign and submit the application, a "signature" screen is displayed. An example of one such screen is shown in FIG. 35.

This concludes the process. The system generates a "thank you" screen (block 236) which is illustrated by the screen shown in FIG. 36.

Figure 7:
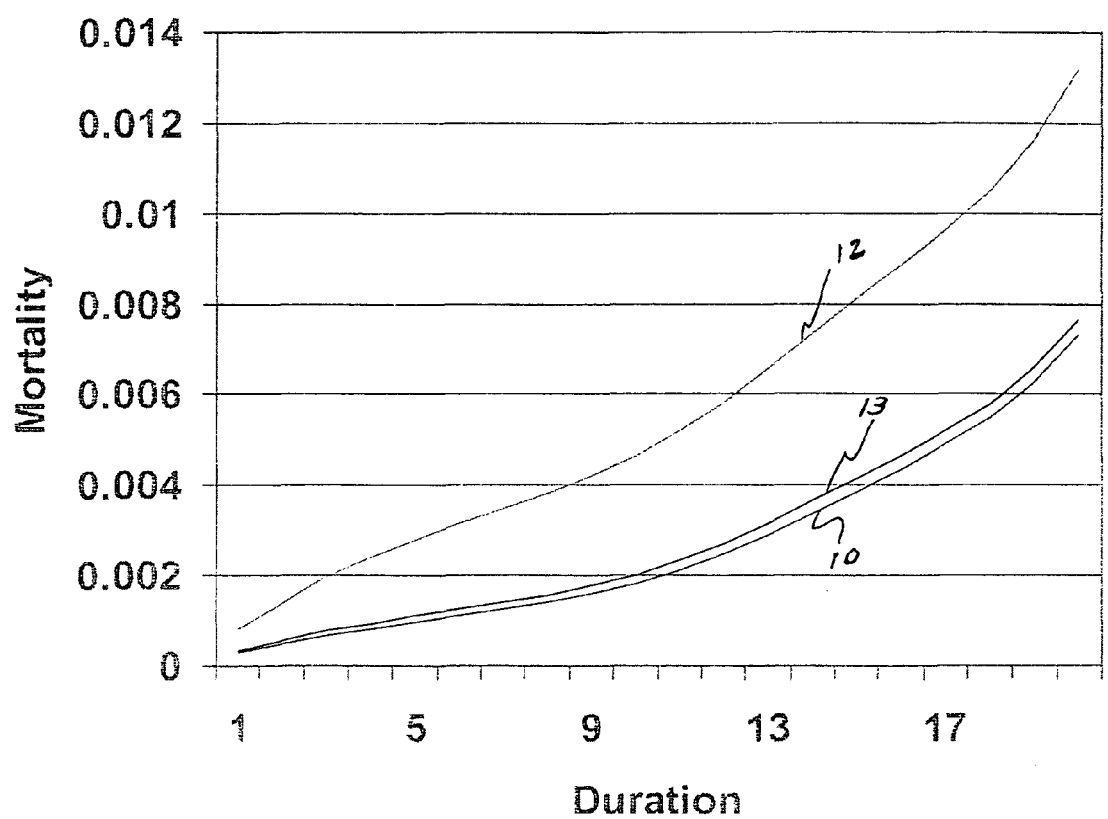
FIG. 7 is a graph which illustrates a mortality comparison for a particular class of insured individuals covered by fully underwritten and simplified issue insurance products, and by product produced by a system and method constructed in accordance with the present invention.

FIG. 7 is a graph which compares the expected mortality rate for a group if individuals insured by a product developed by the system and method described above with the products referred to in connection with FIG. 1. As in FIG. 1, line 10 indicates the expected mortality of a class of insureds covered by a fully underwritten product. Line 12 illustrates the expected mortality of the same class of insureds covered by a simplified issue product. Line 13 illustrates the expected mortality of a comparable group of insureds evaluated by the present system and method. As is illustrated in FIG. 7, the expected performance of the present system and method closely approximates that of fully underwritten products.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An automated method of evaluating an insurable risk and providing an immediate binding insurance offer to cover that risk, comprising the steps of:
   a. collecting self-reported information relating to the insurable risk from an applicant via an input/output interface of a single point of sale kiosk;
   b. collecting a plurality of measurements of objective information relating to the insurable risk from the applicant by measuring, in a single session at the single point of sale kiosk, physiological aspects of the applicant using one or more medical measuring devices, at least one of the one or more medical measuring devices performing the measurement of a physiological aspect by obtaining a biological sample from the applicant and performing medical analysis using the sample;
   c. providing the self-reported information and the objective information collected in the single session to an automated underwriting system located in the single point of sale kiosk;
   d. evaluating, rating and underwriting, at the point of sale kiosk, the insurable risk of the applicant by performing an individualized risk analysis calculation at the automated underwriting system located in the single point of sale kiosk based on the self-reported information and the objective information, the evaluating, rating and underwriting of the insurable risk being performed without forwarding the self-reported and objective information to an external risk analysis system; and
   e. providing an insurance offer relating to a specific insurance product based on the rated insurable risk for review and acceptance by the applicant.

2. The automated method of claim 1, further comprising the step of obtaining, via electronic means, consent from the applicant to provide the self-reported and objective information to the automated underwriting system.

3. The automated method of claim 1, further comprising the step of producing a preliminary rate quote for the applicant based only upon the self-reported information.

4. The automated method of claim 1, further comprising the step of obtaining electronic authorization from the applicant for the immediate release of further objective information from at least one of a health care provider, pharmacy or pharmacy benefit manager, a consumer reporting agency and the Medical Information Bureau, and for evaluation of such objective information by the automated underwriting system.

5. The automated method of claim 1, wherein the step of collecting the self-reported information includes providing information-gathering apparatus for use by an applicant in reporting the self-reported information.

6. The automated method of claim 5, wherein said information-gathering apparatus includes at least one of a keyboard, a display, a touch screen display, and a pointing device.

7. The automated method of claim 5, wherein the step of providing information-gathering apparatus includes providing an automated application to elicit self-reported information from the applicant.

8. The automated method of claim 7, wherein the automated application includes multiple screens and multiple levels for eliciting self-reported information from the applicant.

9. The automated method of claim 8, wherein at least one of the screens presented to the applicant in at least one of the multiple levels is selected in response to information reported by the applicant in a preceding level.

10. The automated method of claim 1, wherein the self-reported information includes at least one of applicant's age, address, citizenship, medical history, family medical history, nicotine usage, alcohol usage, drug usage, motor vehicle information, aviation information, and hazardous activities information.

11. The automated method of claim 4, wherein the objective information includes at least one of height and weight, blood pressure, pulse rate, blood cholesterol, blood glucose, evidence of drug usage, HIV exposure, tumor markers, evidence of tobacco usage, lung capacity, and evidence of kidney disease, and the further objective information includes at least one of information from the Medical Information Bureau, information relating to prescribed drugs, consumer credit information, and motor vehicle information.

12. The automated method of claim 1, further comprising the step of collecting information relating to a beneficiary of the insurance product.

13. The automated method of claim 1, further comprising the step of producing an immediate final rate quote for the applicant based upon the self-reported and objective information.

14. The automated method of claim 13, further comprising the step of providing an insurance application relating to the insurance product.

15. The automated method of claim 14, further comprising the step of collecting information relating to payment for the insurance product if the final rate quote is accepted by the applicant.

16. The automated method of claim 14, further comprising the steps of obtaining an electronic signature from the applicant and producing a printed copy of the application and providing the copy to the applicant.

17. A system for evaluating an insurable risk and providing an immediate binding insurance offer to cover that risk, comprising:
   a. means for collecting self-reported information relating to the insurable risk from an applicant;
   b. means for collecting a plurality of measurements of objective information relating to the insurable risk from the applicant by measuring, in a single session at a single point of sale kiosk, physiological aspects of the applicant using one or more medical measuring means, at least one of the one or more medical measuring means performing the measurement of a physiological aspect by obtaining a biological sample from the applicant and performing medical analysis using the sample;

c. an automated underwriting program executed in the single point of sale kiosk; and
d. means for providing the self-reported information and the objective information collected in the single session to the automated underwriting program executed in the single point of sale kiosk;
e. wherein said automated underwriting program executed in the single point of sale kiosk evaluates rates and underwrites, at the point of sale kiosk, the insurable risk of the applicant by performing an individualized risk analysis calculation based on the self-reported information and the objective information and produces a binding insurance rate quote relating to an insurance product based on the rated insurable risk to cover the risk, the evaluating, rating and underwriting of the insurable risk being performed without forwarding the self-reported and objective information to an external risk analysis system.

18. The system of claim 17, wherein said means for collecting self-reported information comprises an automated application and information-gathering apparatus, said apparatus comprising at least one of a keyboard, a display, a touch screen display, and a pointing device for use in entering information into the automated application.

19. The system of claim 18, wherein the automated application includes multiple screens and multiple levels for eliciting self-reported information from the applicant.

20. The system of claim 19, wherein at least one of the screens presented to the applicant in at least one of the multiple levels is selected in response to information reported by the applicant in a preceding level.

21. The system of claim 17, wherein the self-reported information includes at least one of: applicant's age, address, citizenship, medical history, family medical history, nicotine usage, alcohol usage, drug usage, motor vehicle information, aviation information, and hazardous activities information.

22. The system of claim 17, wherein the automated underwriting program comprises means for producing a preliminary rate quote for the applicant based only upon the self-reported information.

23. The system of claim 17, wherein the means for collecting objective information by measuring physiological aspects of the applicant further includes at least one of: means for measuring height and weight; means for measuring blood pressure; means for measuring pulse rate; means for measuring blood cholesterol; means for measuring blood glucose; means for detecting evidence of drug usage; means for detecting HIV exposure; means for detecting tumor markers; means for detecting evidence of tobacco usage; means for measuring lung capacity; and means for detecting evidence of kidney disease.

24. The system of claim 17, further comprises:
means for collecting further objective information including information from the Medical Information Bureau.

25. The system of claim 24, wherein the further objective information includes information relating to prescribed drugs.

26. The system of claim 24, wherein the further objective information includes consumer credit information.

27. The system of claim 24, wherein the further objective information includes motor vehicle information.

28. The system of claim 17, wherein the automated underwriting program comprises means for producing a final rate quote for the applicant based upon the self-reported and objective information.

29. The system of claim 17, further comprising means for producing an insurance application relating to the insurance product.

30. The system of claim 29, further comprising an output device for producing a copy of the insurance application for the applicant.

31. A system for evaluating an applicant for life insurance and for providing an immediate binding insurance offer for review and acceptance by the applicant, comprising:
a. information collecting apparatus comprising a display, an automated life insurance application which can be viewed by the applicant using the display, and an input device for use by the applicant in entering self-reported information;
b. one or more medical measuring stations for collecting objective information from the applicant by measuring, in a single session at a single point of sale kiosk, physiological aspects of the applicant, at least one of the one or more medical measuring stations performing the measurement of a physiological aspect by obtaining a biological sample from the applicant and performing medical analysis using the sample;
c. a processor, located in the single point of sale kiosk, that executes a life insurance underwriting program, which evaluates, rates and underwrites, at the point of sale kiosk, the insurable risk of the applicant by performing an individualized risk analysis calculation, the evaluating, rating and underwriting of the insurable risk being performed without forwarding the self-reported and objective information to an external risk analysis system;
d. means for inputting information from the apparatus for collecting self-reported information and the objective information from said one or more medical measuring stations in the single session at the single point of sale kiosk, to the processor located in the single point of sale kiosk for use by the life insurance underwriting program;
e. means for displaying to the applicant a final quote which is determined based upon both the self-reported information and the objective information and is underwritten by the life insurance underwriting program; and
f. an input device for use by the applicant in acknowledging the final quote.

32. The system of claim 31, wherein said life insurance underwriting program provides an insurance application for review and acceptance by the applicant.

33. The system of claim 31, wherein said one or more medical measuring stations for collecting objective information from the applicant by measuring physiological aspects of the applicant include at least one of: apparatus for measuring height and weight; apparatus for measuring blood pressure; apparatus for measuring pulse rate; apparatus for measuring blood cholesterol; apparatus for measuring blood glucose; apparatus for detecting evidence of drug usage; apparatus for detecting HIV exposure; apparatus for detecting tumor markers; apparatus for detecting evidence of tobacco usage; apparatus for measuring lung capacity; and apparatus for detecting evidence of kidney disease.

34. The system of claim 31, further comprising one or more stations for collecting further objective information from the applicant including information from the Medical Information Bureau.

35. The system of claim 34, wherein said further objective information includes information relating to prescribed drugs.

36. The system of claim 34, wherein said further objective information includes consumer credit information.

37. The system of claim 34, wherein said further objective information includes motor vehicle information.

38. A computer-based system for capturing data at a point of sale relating to mortality or morbidity risk assessment and a related insurance product, said system comprising:
- a processor;
- a memory;
- an input device connected to the processor for use in entering data relating to an applicant, including the applicant's age, for storage in the memory;
- a plurality of medical measuring stations for collecting objective medical and/or physical data from the applicant by measuring physiological aspects of the applicant in a single session at a single point of sale kiosk, at least one of the plurality of medical measuring stations performing the measurement of a physiological aspect by obtaining a biological sample from the applicant and performing medical analysis using the sample; and
- data communications link connecting the stations to the processor;
- wherein said processor is programmed to receive the objective medical and/or physical data via the data communications links, to store the received objective medical and/or physical data in the memory, and to evaluate, rate and underwrite, at the point of sale kiosk, the insurable risk of the applicant by performing an individualized risk analysis calculation using the stored objective medical and/or physical data, the evaluating, rating and underwriting of the insurable risk being performed without forwarding the self-reported and objective information to an external risk analysis system.

39. The system of claim 38, further comprising a risk assessment program for assessing a mortality or morbidity insurance risk using the stored data in the memory.

40. The system of claim 38, further comprising a data communication link for use by the processor in transmitting the data stored in the memory to a mortality or morbidity risk assessment system, and for receiving a risk assessment from the remote mortality or morbidity risk assessment system.

41. The system of claim 38, further comprising program means for generating a life insurance policy using the information stored in the memory, means for confirming an identity of the applicant, and means for receiving an electronic signature of the applicant.

42. The system of claim 38, wherein said data communications link comprises a wired or wireless data communications link.

43. The system according to claim 38, wherein at least one of the plurality of medical measuring stations includes apparatus for analyzing at least one of saliva, blood, urine and hair samples.

44. The system according to claim 38, wherein at least one of the plurality of medical measuring stations includes at least one of an apparatus for measuring blood cholesterol, blood glucose, blood pressure, heart rate, lung capacity, weight and height.

45. The system according to claim 38, wherein at least one of the plurality of medical measuring stations includes at least one of apparatus for detecting drug usage, tobacco usage, tumor markers, exposure to HIV and kidney disease.

46. The system according to claim 39, wherein said insurance risk assessment program includes at least one expert system.

47. The automated method of claim 1, wherein the medical measuring device is an Applicant operated medical measuring device.

48. The automated method of claim 1, wherein the single session is performed in a single physical location.

49. The automated method of claim 1, wherein the single session is complete before the providing step provides the objective information collected in the single session to the automated underwriting system.

* * * * *